US006633801B1

(12) United States Patent
Durlacher et al.

(10) Patent No.: US 6,633,801 B1
(45) Date of Patent: Oct. 14, 2003

(54) METHOD AND APPARATUS FOR PROVIDING INFORMATION TO PILOTS

(76) Inventors: Stanley H. Durlacher, 922 Concord St., Carlisle, MA (US) 01741-1523; Paul A. Mandrafino, 27 Irma Ave., Watertown, MA (US) 02471

(*) Notice: Subject to any disclaimer, the term of this patent is extended or adjusted under 35 U.S.C. 154(b) by 0 days.

(21) Appl. No.: 09/694,093

(22) Filed: Oct. 20, 2000

Related U.S. Application Data

(60) Provisional application No. 60/160,533, filed on Oct. 20, 1999.

(51) Int. Cl.[7] ................................................ G06F 17/00

(52) U.S. Cl. ................................ 701/9; 701/3; 701/14; 701/29; 701/30; 340/973; 345/204; 345/205

(58) Field of Search ................................ 701/3, 14, 29, 701/30, 200–215, 9; 340/975, 974, 973, 977, 976, 971; 345/1–3, 204, 205; 342/357.06; 235/61 NV

(56) References Cited

U.S. PATENT DOCUMENTS

| | | | | | |
|---|---|---|---|---|---|
| 3,589,327 | A | | 6/1971 | Jacobs | |
| 3,924,111 | A | | 12/1975 | Farris | |
| 4,642,775 | A | * | 2/1987 | Cline et al. | 701/200 |
| 4,790,758 | A | | 12/1988 | Bellofatto | |
| 4,827,419 | A | * | 5/1989 | Selby, III | 701/200 |
| 4,831,538 | A | * | 5/1989 | Cucchiari et al. | 235/61 NV |
| 4,887,249 | A | | 12/1989 | Thinesen | |
| 5,050,138 | A | | 9/1991 | Yamada et al. | |
| 5,265,024 | A | * | 11/1993 | Crabill et al. | 701/200 |
| 5,454,074 | A | | 9/1995 | Hartel et al. | |
| 5,581,462 | A | * | 12/1996 | Rogers | 701/3 |
| 5,758,297 | A | * | 5/1998 | Gaultier | 340/971 |
| 5,813,000 | A | * | 9/1998 | Furlani | 707/3 |
| 5,978,715 | A | * | 11/1999 | Briffe et al. | 701/11 |
| 6,057,786 | A | * | 5/2000 | Briffe et al. | 340/975 |
| 6,064,922 | A | * | 5/2000 | Lee | 342/357.06 |
| 6,112,141 | A | * | 8/2000 | Briffe et al. | 345/1.3 |
| 6,292,747 | B1 | * | 9/2001 | Amro et al. | 701/213 |

FOREIGN PATENT DOCUMENTS

| | | |
|---|---|---|
| FR | 7602268 | 1/1976 |
| FR | 8813669 A1 | 4/1990 |

OTHER PUBLICATIONS

Sporty's A300, p. 20.

Sporty's Electronic Checklist, p. 3.

Section 2. Pilot Weather Report (UA/UUA), http://www.faa.gov/ATPubs/FSS/Ch9/fss0902.html, pp. 1–12.

Weather: PIREPS, Pilot Reported In–flight Weather Observations, http://nasaui.ited.uidaho.edu/nasapark/safety/weather/pireps.html, pp. 1–2.

* cited by examiner

*Primary Examiner*—Thomas G. Black
*Assistant Examiner*—Ronnie Mancho
(74) *Attorney, Agent, or Firm*—Michael R. Reinemann; Cesari and McKenna, LLP

(57) ABSTRACT

A portable computer system allows a pilot to efficiently and effectively manage time-oriented and other flight-related tasks. The system preferably includes a microprocessor coupled to a display/input screen. The microprocessor, which includes or is coupled to a timer, preferably executes one or more application programs that are configured to receive information from and display information to the pilot. The application program is preferably hierarchically arranged and menu-driven for navigating among the various displays and thereby retrieving the desired information or initiating the desired functionality.

13 Claims, 10 Drawing Sheets

METHOD AND APPARATUS FOR PROVIDING INFORMATION TO PILOTS

CROSS-REFERENCE TO RELATED APPLICATION

The present application claims priority from U.S. Provisional Patent Application Ser. No. 60/160,533, which was filed on Oct. 20, 1999 by Stanley Durlacher and Paul Mandrafino for a METHOD AND APPARATUS FOR DISPLAYING INFORMATION TO PILOTS IN REAL-TIME and is hereby incorporated by reference.

FIELD OF THE INVENTION

The present invention relates generally to time management devices for use by pilots and, more specifically, to a portable computer system that allows pilots to more efficiently and effectively manage the time-oriented and other aspects of their flights.

BACKGROUND OF THE INVENTION

There are basically two areas in which pilots must adhere to time-sensitive procedures. The first are precision flight maneuvers in which time is critical to remain within certain Federal Aviation Administration (FAA) limits, and the other is to monitor flight progress and aircraft subsystems on a periodic basis to ensure safe and proper operation of the aircraft. A typical flight may be divided into the following phases: pre-flight, enroute, approach, holding and post-flight. The enroute route phase is made up of a series of legs between various waypoints. Pilots must monitor the actual time taken to fly each leg to obtain accurate fuel consumption information. During the approach and holding phases of the flight, the pilot typically must perform a series of precise, time-dependent maneuvers.

Before taking off, many pilots prepare a handwritten flight plan. This flight plan typically includes the waypoints that are to be flown during the flight. The handwritten flight plan is often attached to a knee board that is secured to the pilot's leg for reference during the flight. To the extent it spans multiple pages, handwritten flight plans can be difficult to consult during the flight. They can also be difficult to read.

Furthermore, during each phase of the flight, pilots are often confronted with multiple demands on their attention and concentration. For example, in addition to flying the aircraft, pilots must typically handle all navigation and communication duties, monitor weather conditions, monitor the aircraft's fuel supply and perform other such tasks. Pilots also must continually review and check cockpit indicators and gauges to monitor the condition and operation of the aircraft's many subsystems. In particular, most aircraft have one or more cockpit displays that reveal the operating condition of the engine, the hydraulic systems, the electrical systems, the fuel systems, the landing gear systems, the auxiliary power units, if any, etc. Pilots flying in inclement weather, in close proximity to other aircraft or in other demanding conditions often neglect to continually scan their indicators and gauges. As a result, pilots may overlook the early warnings of an impending failure until it is too late to take corrective action.

While enroute, the pilot may also encounter an emergency situation. Most aircraft have emergency checklists identifying the corrective action to be taken in response to many different types of emergencies. Although these procedures are often contained in a loose-leaf, print format that is designed for relatively easy access, it can be difficult and/or time consuming to locate the specific pages corresponding to the particular emergency being faced. Flipping between multiple pages of the emergency checklist is similarly awkward especially where the pilot is busy controlling the flight characteristics of the aircraft as a result of the emergency.

In addition, the pilot may be interrupted during execution of the emergency checklist. For example, a call may come over the communications system that must be responded to or some other action may need to be taken. When the pilot returns to the checklist, he or she may forget the point at which he or she was interrupted. That is, the pilot may not remember which portions of the checklist have been completed and which portions still need to be completed.

Despite the importance of time-management during flight, the only devices currently available are conventional stopwatch timers and sweep second-hand stopwatches and clocks. Accordingly, a need exists for a more comprehensive and user-friendly device to assist pilots in time-management and other flight-related tasks.

SUMMARY OF THE INVENTION

Briefly, the present invention is directed to a system and method that facilitates the management of time-oriented and other flight-related tasks. In the illustrative embodiment, the system includes a hand-held computer having a microprocessor, a memory and a display/input screen. The microprocessor, which includes or is coupled to a timer, preferably executes one or more novel application programs that are configured to request information from and display or provide information to the pilot at appropriate times during a flight. The application program is preferably menu-driven so that the pilot may easily navigate among the various displays and retrieve desired information or initiate desired functionality, such as activating one-or-more-count-Tupor count-down timers or displaying one or more-electronic-checklists The system may also include a visual, tactile and/or aural warning element.

In a first aspect, the system, including the application program, is configured to display one or more bulletins at pre-arranged times during flight. More specifically, during the preflight phase, the pilot preferably programs the system to generate and display one or more bulletins prompting the pilot to check the status of specific aircraft subsystems or to perform some other flight-related tasks. The bulletins can be programmed to occur at a single preset time during the flight or they can be set to occur periodically throughout the flight. For example, the system can be programmed to display a first bulletin directing the pilot to check the engine oil and fuel systems every seven minutes, while a second bulletin prompts the pilot to check the generator or electrical subsystem only every fourteen minutes. As the flight progresses, the system automatically interrupts the current application or process and displays the bulletins at the programmed time intervals. Once the displayed task has been performed, the pilot preferably acknowledges its completion by pressing an "acknowledgement" key or button which may be displayed on the screen and/or may be remotely located from the system, e.g., a thumb switch coupled to the system. Following the acknowledgement, the application program preferably causes the next bulletin to be displayed at the appropriate time. If no acknowledgment is received after a pre-set time, the application program may activate the warning element.

In a second aspect, the system facilitates the creation of pilot reports (PIREPS). that can be transmitted by the pilot to an air traffic controller (ATC). PIREPS preferably follow a specific, FAA-approved format (e.g., sequence of information) and utilize a number of abbreviations that can be difficult to remember. Because of the complexity of the format and abbreviations, many pilots do not provide PIREPS. The application program is preferably configured to display one or more windows or menus, upon request, that solicit particular information from the pilot, including location, weather, etc., in an easy-to-read and easy-to-understand format. The program includes a PIREP conversion engine that translates the information provided by the pilot into a PIREP-compatible format for display. The pilot can then simply read the system generated and displayed PIREP over the aircraft's communication subsystem to the ATC.

In a third aspect, the application program provides one or more novel timer displays to facilitate flying precision maneuvers, such as holding and approach maneuvers. Specifically, the application program is configured to generate an approach timer window that includes a settable pending timer field or window and an active timer field or window. Within the pending timer field, the pilot preferably enters the time value associated with flying the next leg or segment of the approach. When the pilot starts this leg, e.g., crosses the initial fix point, the pilot selects a start button. In response, the application program copies into the active timer field the time value that was entered in the pending timer field and begins a count-up or a count-down based on that time value. During execution of the first leg, the pilot can enter the time associated with the next approach leg in the pending timer field. At the end of the first leg, the pilot can again enter the start button causing the program to copy the newly entered time value from the pending timer window into the active timer window and to begin the count up or the count down. This process can be repeated until the pilot lands the aircraft.

BRIEF DESCRIPTION OF THE DRAWINGS

The invention description below refers to the accompanying drawings, of which.

DESCRIPTION OF THE PREFERRED EMBODIMENT

Figure 1:
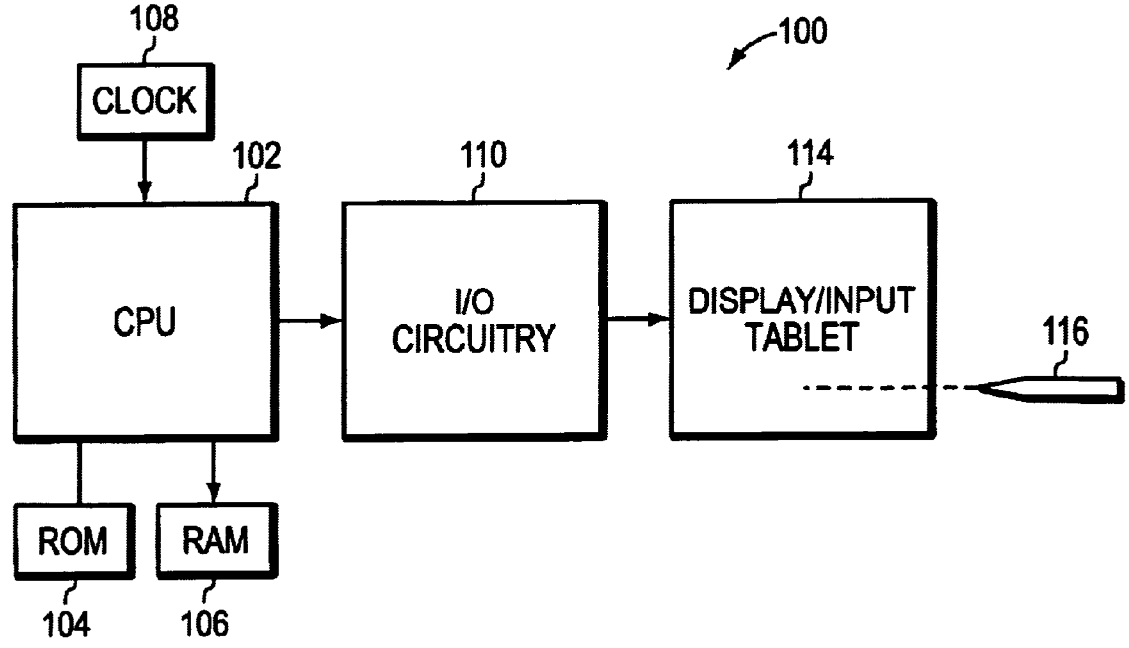
FIG. 1 is a highly schematic, functional block diagram of the computer system of the present invention.

FIG. 1 shows a computer system 100 in accordance with the present invention. The system 100 includes a central processing unit (CPU) 102 that is coupled to a read only. memory (ROM) 104 for receiving one or more instruction sets and to a random access memory (RAM) 106 which may be organized into a plurality of buffers or records for temporarily storing and retrieving information. A clock 108 is also coupled to the CPU 102 for providing clock or timing signals or pulses thereto. The computer system 100 further includes input/output (I/O) circuitry 110 that interfaces between the CPU 102 and one or more peripheral devices, such as a touch-sensitive screen 114 and/or a penbased display/input tablet. A user may control or interact with the computer system 100 by writing, drawing or signaling on the tablet 114 with his or her finger, e.g., or by tapping on one or more keys or buttons that may be displayed, or with a pen or stylus 116. Those skilled in the art will understand that the computer system 100 includes one or more bus structures for interconnecting its various components, and that communication between the components may be effected either through polling or via interrupts.

A suitable computer system 100 for use with the present invention include the Palm series of palm PCs from Palm Inc. of Santa Clara, Calif. which are controlled and coordinated by operating system software, such as the Palm OS® operating system. However, other palm PCs, such as but not limited to the Cassiopeia series of palm PCs from Casio Computer Co., Ltd. of Tokyo Japan or the iPAQ series of palm PCs from Compaq Computer Corp. of Houston, Texas, which are controlled and coordinated by the Windows CE operating system from Microsoft Corporation of Redmond, Wash., may also be advantageously used with the present invention. Additionally, the present invention may be practiced with laptop or notebook computers, such as the Presario and/or Armada series of laptops from Compaq Computer Corp.

Figure 2:
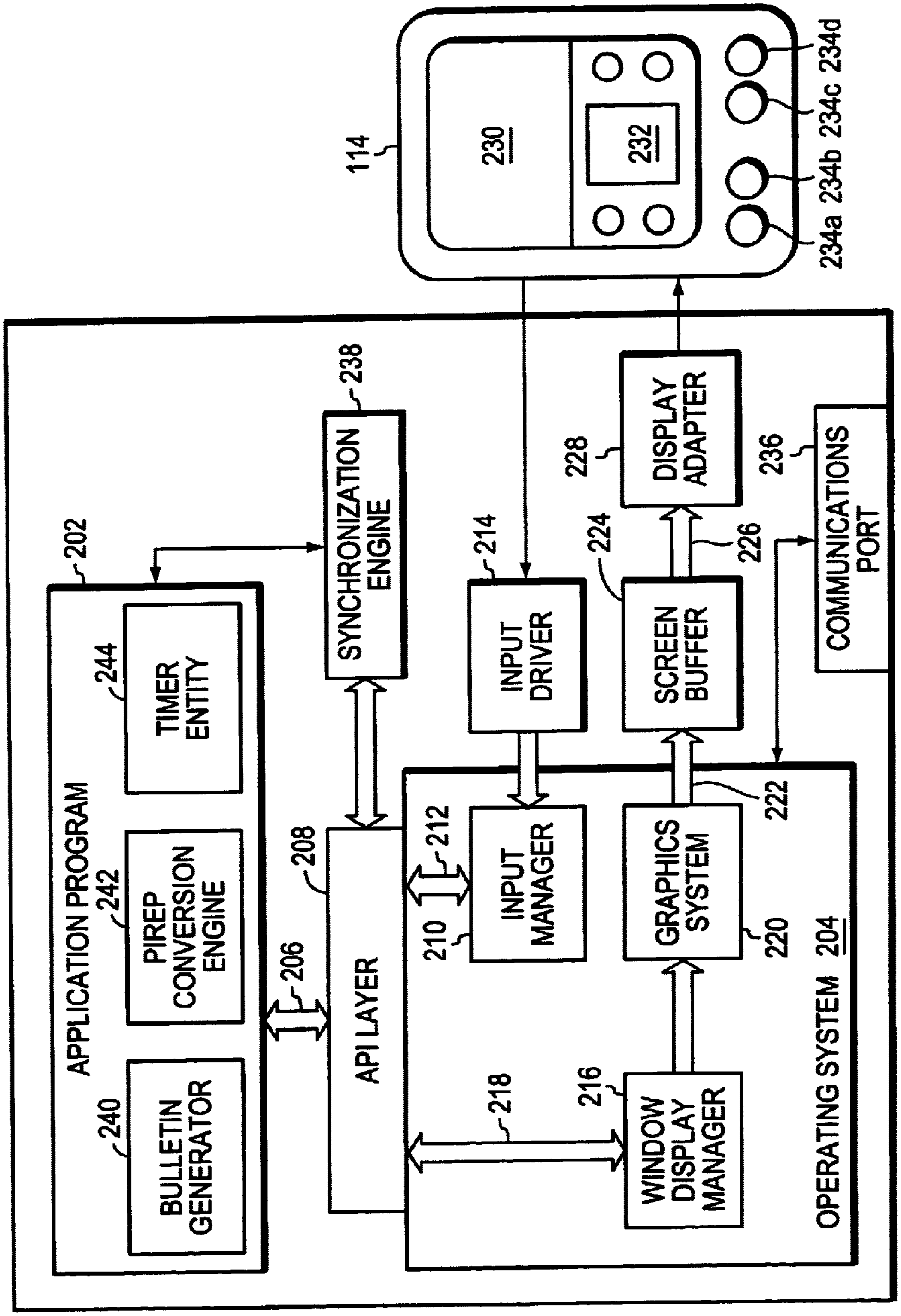
FIG. 2 is a highly schematic diagram of the display/input tablet and various software components of the computer system of FIG. 1.

FIG. 2 is a highly schematic, partial, functional block diagram of several software components running on computer system 100 (FIG. 1) and their interaction with the display/input tablet 114. These software components generally include one or more application programs, such as application program or process 202, and an operating system 204. The application program 202 executes on the computer system 100 and interacts with the operating system 204 as shown by arrow 206 through system calls or task commands of an application programming interface (API) layer 208 in order to control the operations of the computer system 100. Lower-layers of the operating system 204 include device drivers for interfacing directly with one or more physical devices or components. That is, for each physical device or component, a corresponding device driver is provided to accept requests, to read or write data or to determine the status of the respective device.

More specifically, the operating system 204 preferably includes an input manager 210 that is coupled to the API layer 208 via arrow 212. The input manager 210 is also coupled to an input driver 214, which, in turn, is in communicating relationship with the display/input tablet 114 for receiving handwritten and other information entered thereon, including sensing or detecting a finger touching or tapping tablet 114. In particular, the input manager 210 receives input information and command or input button interrupts from the input driver 214 as generated by the tablet 114. One or more handwriting recognition engines (not shown) may be installed on the computer system 100 for performing recognition analysis on received input information.

The operating system 204 further includes a window/display manager 216 which also implements task commands from the application program 202. The window manager 216 is typically a set of software routines or modules within the operating system 204 that is responsible for managing windows and graphics displayed on the tablet 114 for viewing by the user, e.g., the pilot, during operation of the system 100. The window manager 216 typically acts in direct response to task commands sent from the application program 202 to the operating system 204 via the API layer 208 as shown by arrow 218. The window manager 216 may use a graphics system 220, also located within the operating system 204, to draw on the display/input tablet 114. The graphics system 220 stores the information to be displayed via arrow 222 into a screen buffer 224. Under the control of various hardware and software in the computer system 100, the contents of the screen buffer 224 may be read out and provided, as indicated schematically by arrow 226, to a display adapter 228. The display adapter 228 contains hardware and software (sometimes in the form of firmware) which converts the information from the screen buffer 224 to a form which can be used to drive the display/input tablet 114.

As indicated above, the tablet 114 is configured to operate as both an input device and an output device. When operating as an output device, tablet 114 receives data from the CPU 102 (FIG. 1) via I/O circuitry 110 and displays that data on a screen 230, such as a liquid crystal display (LCD) screen. The input mechanism of tablet 118 is preferably a thin, clear membrane (not shown) overlying the screen 230 that is sensitive to the position and/or pressure of the pen 116 (FIG. 1) or the presence and location of the user's finger on its surface. Tablet 114 may also include a dedicated input area 232 for receiving input from either the pen 116 or the user's finger. It may further include one or more "hard" keys 234*a–d*, which may be pressed or otherwise activated by the user. In operation, a user can provide inputs to the computer system 100 by "writing" on the screen 230 or input area 232 with the pen 116 or by tapping buttons that are displayed on the screen 230 with either the pen 116 or his or her finger depending on the mode of operation selected. Information concerning the location of the pen 116 during handwriting operation and/or the user's finger is preferably sampled and provided to the CPU 102 via I/O circuitry 110.

Computer system 100 may also include one or more communications ports, such as port 236, which is coupled to the operating system 204. Port 236 may be used to couple computer system 100 to another computer (not shown), such as a desktop or laptop personal computer. In addition, computer system 100 may further include or run a synchronization engine 238. The synchronization engine 238 is preferably configured to receive information or data from the second computer and synchronize that information to corresponding data records or locations stored or configured at one or more memory structures of computer system 100, such as RAM 106. A suitable synchronization engine includes but is not limited to the HotSync software commercially available from Palm Inc.

Application program 202, moreover, preferably comprises a plurality of software modules or libraries pertaining to the methods described herein. In particular, program 202 may include a bulletin generator 240, a PIREP conversion engine 242 and a timer entity 244, among other things.

The software modules or libraries that make up application program 202 may be resident on a computer readable media, such as RAM 106 (FIG. 1) or a mass memory device (not shown), and executed by one or more processing elements, such as CPU 102. Other computer readable media, such as floppy disks and CD-ROMs, may also be used to store the program instructions for execution or transfer. The application program 202 may also be implemented in hardware through a plurality of registers and combinational logic configured to produce sequential logic circuits and cooperating state machines. Those skilled in the art will recognize that various combinations of hardware and software components may also be employed.

Figure 3:
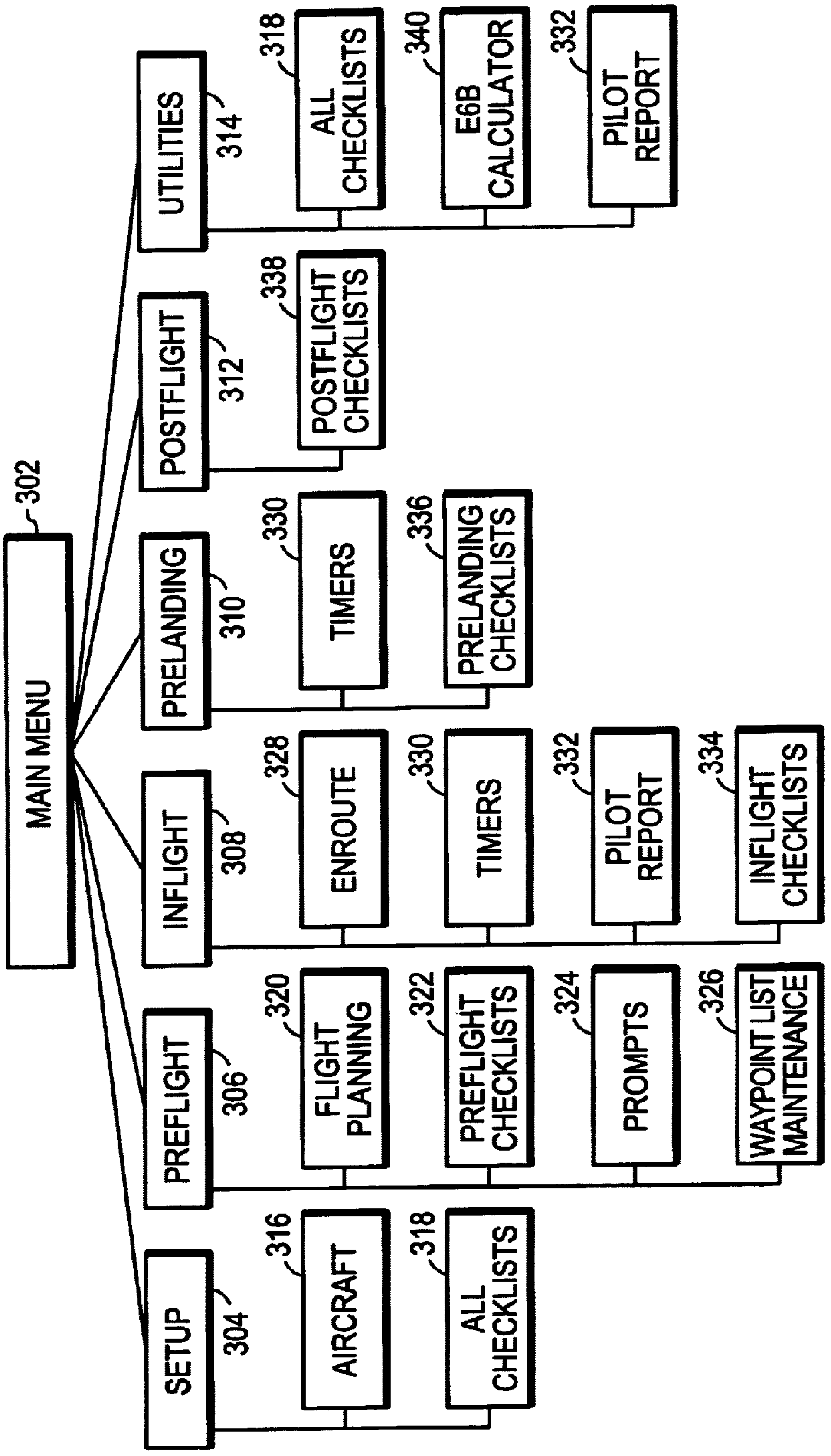
FIGS. 3 is a highly schematic illustration of the menu-driven application program of the present invention.

FIG. 3 is a highly schematic illustration of the menu-driven features or facilities of the application program 202. As shown, the application program 202 is preferably hierarchically organized and menu driven so as to provide a plurality of different modes or phases of operation for the user, such "Setup", "Preflight", "Inflight", "Prelanding", "Postflight" and "Utilities". The pilot preferably selects among these different modes depending on the phase of the flight. Each mode, moreover, may have a plurality of features or facilities that can be selected and run by the pilot. Specifically, program 202 includes a main menu 302. From the main menu 302, the pilot may access a plurality of sub-menus or modes, including a setup mode 304, a preflight mode 306, an inflight mode 308, a prelanding mode 310, a postflight mode 312 and a utilities mode 314. From each sub-menu or mode 304–314, the pilot may access and/or run one or more facilities.

In particular, from the setup mode 304, the pilot may access and run an aircraft setup facility 316 and a checklists facility 318. From the preflight mode 306, the pilot may access a flight planning facility 320, a preflight checklists facility 322, a prompts facility 324, and a waypoint list maintenance facility 326. From the inflight mode 308, the pilot may access an enroute facility 328, a timers facility 330, a pilot report facility 332, and an inflight checklists facility 334. From the prelanding mode 310, the pilot may access the timers facility 330, which is preferably the same timers facility as may be accessed through the inflight sub-menu 308. The pilot may also access a prelanding checklists facility 336. From the postflight mode 312, the pilot may access a postflight checklists facility 338. From the utilities mode 314, the pilot may access the same checklists facility 318 as accessible from the setup mode, an E6B calculator facility 340 and the pilot report facility 332.

FIGS. 4–8 are exemplary screen displays generated by the application program 202 in response to the selection and running of various modes and facilities by the pilot. These screen displays show how a pilot might operate the system 100.

Figure 4:
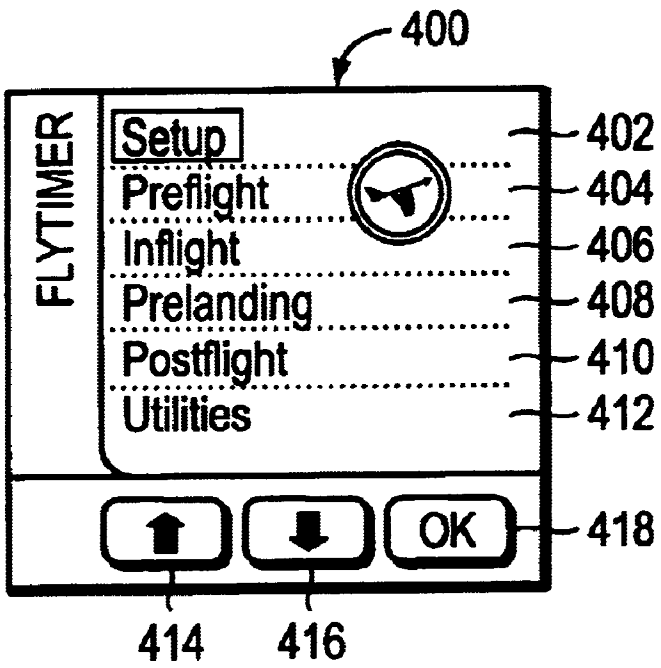
FIGS. 4–8 are exemplary screen displays generated by the system of the present invention.

FIG. 4 is a main menu 400 screen display. The main menu 400 includes six selectable buttons which represent the available modes. Specifically, there is a setup button 402, a preflight button 404, an inflight button 406, a prelanding button 408, a postflight button 410 and a utilities button 412. The main menu 400 may also include up and down arrows 414 and 416 for scrolling through the buttons 402–412 and an OK or select (SEL) button 418 for selecting the highlighted button. A desired mode of the application program 202, e.g., setup, can be entered by keying the corresponding button, e.g., button 402. For example, the pilot can tap button 402 twice, or he or she can tap the arrows 414 and 416 until the desired button is highlighted and then tap the OK button 418.

Setup

By selecting the setup button 402, the pilot is transferred to the setup mode of the application program 202. FIGS. 5A–D are exemplary screen displays generated by the application program 202 while operating in the setup mode 304. A first-level setup screen or window 500 (FIG. 5A) allows the pilot to call-up two facilities: the aircraft facility 316 (FIG. 3) as represented by aircraft button 502 and the checklists facility 318 as represented by checklist button 504. Tapping the aircraft button 502 will cause the application program 202 to transfer programming control the aircraft facility 316. Facility 316 causes an aircraft setup screen or window 506 (FIG. 5B) to be displayed on screen 230. Screen 506 prompts the pilot for various information about himself or herself and the aircraft that he or she will be flying. For example, screen 506 preferably includes a pilot field 508 in which the pilot may enter his or her name. An alphanumeric (ABC . . . ) icon 510 is preferably provided as part of the setup screen 506. Tapping the alphanumeric icon 510 causes an alphanumeric keypad screen 512 (FIG. 5C) to be displayed. Keypad screen 512 includes a plurality of buttons that facilitate the entry of text and/or numbers. Tapping an OK button 513 causes the letters and numbers entered with the keypad 512 to be copied into the pilot field 508.

A type field 514 (FIG. 5B) of the aircraft setup screen 506 requests the type of aircraft that is going to be flown, e.g., C-172 for a Cessna 172 aircraft. An identifier (ID) field 516 requests an identifier of the aircraft, such as its tail or "N" number. A Universal Coordinated Time (UTC) field 518 may be provided to enter a value corresponding to the offset or conversion from local time to UTC time. The conversion from Eastern Standard Time (EST) to UTC time, for example, is plus five hours. Accordingly, if the pilot is flying in the EST zone, a "5" may be entered in UTC field 518. The computer system 100 is preferably configured or programmed with the local time in a conventional manner. A true airspeed (TAS) field 520 allows the pilot to enter a true cruise airspeed for the aircraft in nautical miles per hour (nn/Hr). A usable fuel capacity (cap) field 522 allows the pilot to enter the aircraft's fuel capacity in gallons. A fuel burn rate field 524 allows the pilot to enter the aircraft's fuel burn rate in gallons per hour (Gal/Hr) at the specified TAS.

Returning to FIG. 5A, if the checklist button 504 is selected, programming control is transferred to the checklists facility 318. The checklists facility 318 preferably includes or has access to one or more checklists that were synchronized to the computer system 100 through the communications port 236 and synchronization engine 238. These checklists, which are typically associated with a specific aircraft or type of aircraft, may be created on a desktop or lap personal computer and synchronized to the computer system 100. Alternatively, they may be obtained from third parties and downloaded to the desktop or laptop personal computer and then synchronized to the computer system 100.

In response to being selected, the checklists facility 318 preferably causes a top-level checklists screen 526 (FIG. 5D) to be displayed on screen 230. Screen 526 includes a plurality of buttons, including a preflight button 528, an inflight button 530, a prelanding button 532, a postflight button 534, an emergency button 536 and a reference button 538. Selection of a button, e.g., preflight button 528, causes the checklists stored under the selected flight phase, e.g., preflight, to be displayed on screen 230. Possible preflight checklists might include Pre-Engine Start, Engine Start, Pre-Taxi, During Taxi; Engine Run-up, etc. Possible emergency checklists might include Engine Failure, Electrical System Failure, Distress Call Protocol, Emergency Landing Checklist, Light Signals, etc. The pilot may access any of the checklists stored on the computer system 100 by accessing the checklists facility 318 from the setup mode 304.

Preflight

Returning to FIG. 4, selection of the preflight button 404 causes programming control to be transferred to the preflight mode 306 of the application program 202. FIGS. 6A–G are exemplary screen displays that may be generated during the preflight mode 306. In response to selecting the preflight button 404, for example, a first-level preflight screen 600 (FIG. 6A) is preferably displayed on screen 230. The preflight screen 600 includes a flight planning button 602, a checklists button 604, a prompt button 606 and a waypoint (waypt) list maintenance (maint) button 608 which are used to access the corresponding facilities 320–326 (FIG. 3) of the application program 202.

Prompts

By selecting the prompt button 606, the prompts facility 324 (FIG. 3) of the application program 202 is called and run. This facility 324 allows the pilot to set up periodic reminders to check an aircraft subsystem or to perform some other flight-related task during the flight. Upon selection, the prompts facility 324 preferably causes a programming window or screen 610 (FIG. 6B) to be displayed on screen 230 (FIG. 2) which is used by the pilot to set a first prompt. Screen 610 includes a message field 612 into which the pilot preferably enters the prompt message that is to be displayed during the flight. Screen 610 includes an alphanumeric (ABC . . . ) icon 612 which, if selected, causes the alphanumeric keypad screen 512 (FIG. 5C) to be displayed to facilitate the entry of text and/or numbers into the message field 612. After entering the prompt message, e.g., "Check gyroscopic procession", the pilot is asked for the first time at which this prompt is to be displayed during the flight. More specifically, after entering the message in field 612, an initial prompt time field 616 (FIG. 6C) is highlighted.

To enter an initial prompt time in field 616, the pilot preferably selects a timer icon 618, which appears in place of the alphanumeric icon 612. In response, application program 202 preferably generates and causes a timer keypad 620 (FIG. 6D) to be displayed on screen 230. Timer keypad 620 includes a plurality buttons that facilitate the entry of a time. By selected buttons of timer keypad 620, the pilot can designate the time, e.g., 12:00 minutes, from the start of the flight that must elapse before the subject prompt is first presented. By tapping an OK button 621, screen 610 is caused to reappear and the entered time value is copied into the prompt time field 616.

In addition to a first time, the pilot may also configure the prompts facility 324 to cause the prompt to be displayed periodically throughout the flight. In particular, screen 610 (FIGS. 6B and 6C) preferably include a repeat checkbox 622. By checking checkbox 622, e.g., by tapping checkbox 622 with his or her finger, the pilot causes a repeat time entry field 624 (FIG. 6E) to be added to the programming window 610. Repeat time entry field 624 includes an interval field 626, an entire flight checkbox 628 and a count field 630. Within the interval field 626, the pilot may enter the frequency, e.g., in minutes, that the subject prompt should be repeated following its initial display as specified in initial prompt time field 616. Again, the pilot may call-up the timer keypad 620 (FIG. 6D) to facilitate the entry of the interval time value by tapping the timer icon 618. Next, the pilot can specify that the subject prompt be repeated at the specified interval during the entire flight by checking checkbox 628. Alternatively, the pilot can specify that the subject prompt be repeated a specified number of times by entering the desired count into a count field 630.

When the pilot has completed the entry of the requisite information for setting the subject prompt as desired, he or she preferably selects an OK button 632. In response, the prompts facility 324 stores the entered information in one or more records or buffers. The prompts facility 324 may then generate a prompts list display 634 (FIG. 6F) including or adding an entry or record 636 for the just created prompt or bulletin, e.g., "check gyroscopic procession". Record 636 includes a first element 636*a* containing both the name and the initial time that the prompt will first be displayed, e.g., "12:00" minutes. A second element 636*b* contains an indicator, e.g., "R" for repeat, if the prompt will repeat. If a specific count had been entered, the count value would also appear. By tapping an add button 638, the pilot may create additional prompts. When the pilot is finished setting up prompts, he or she taps an OK button 640.

Prompts may also be programmed at the desktop or laptop personal computer and downloaded and/or synchronized to the computer system 100.

Figure 6G:
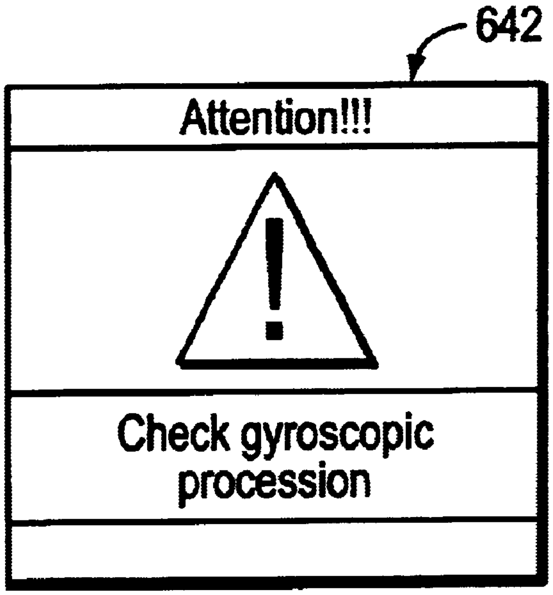

Upon commencement of the flight, the pilot activates an enroute timer operated by the application program 202. The enroute timer basically maintains a running time count for the flight. For example, the pilot may tap a start button from a display screen called-up and used during the first leg of the flight, i.e., a screen showing the take-off airport and the first waypoint of the flight. The prompts facility 324 monitors elapsed time of the flight and causes the previously programmed prompt(s) to be displayed at the specified time(s). More specifically, the prompts facility 324 interrupts the current facility, application program or process running at computer system 100 in order to display the prompt. FIG. 6G is an illustrative display of a "check gyroscopic procession" prompt window or message 642 that is preferably displayed on screen 230 at the programmed time(s). The prompt 642 is preferably acknowledged by the pilot when he or she taps anywhere on screen 230, thereby causing the prompt message 642 to disappear and returning program control to the facility, application program or process that was interrupted by the prompts facility 324.

If the pilot does not acknowledge the prompt message 642 within a preset time, e.g., 1 to 5 minutes, the prompts facility 324 may cause an aural, visual and/or tactile warning element controlled by the computer system 100 to be activated. For example, prompts facility 324 may cause screen 230 to begin flashing until the prompt message is acknowledged.

It should be understood that other windows or screens may be used to program and/or display prompts. It should be further understood that a specific acknowledge key, e.g., a hard key, may be provided on the computer system 100 or remotely coupled to the computer system, e.g., through a thumb-switch that may be mounted to the yoke of the aircraft. Alternatively or in addition, an acknowledgement button may be displayed on prompt screen 642, which can be tapped by the pilot to acknowledge completion of the is task specified by the prompt.

Inflight

Figure 7A:
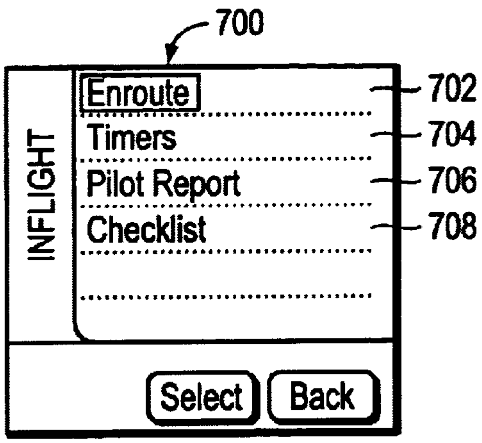

Returning to FIG. 4, selection of the inflight button 406 causes programming control to be transferred to the inflight mode 308 of the application program 202. FIGS. 7A–P are exemplary screen displays that may be generated during the inflight mode 306. In response to selecting the inflight button 406, a first-level inflight screen 700 (FIG. 7A) is preferably displayed on screen 230. The inflight screen 700 includes an enroute. button 702, a timers button 704, a pilot reports button 706 and a checklist button 708 which are used to access or run the corresponding facilities 328–334 (FIG. 3) of the application program 202.

Pilot Reports

By selecting the pilot reports button 706, the pilot reports facility 332 (FIG. 3) of the application program 202 is called and run. This facility 332 induces the pilot to enter information that is then converted into a format that is compatible with accepted or standard PIREPS transmissions. Specifically, upon selection, the pilot reports facility 332 preferably causes a series of, e.g., six, information entry windows or screens to be displayed sequentially on screen 230 (FIG. 2). These windows or screens seek particular information from the pilot which is then used to generate the PIREP.

Figure 7B:
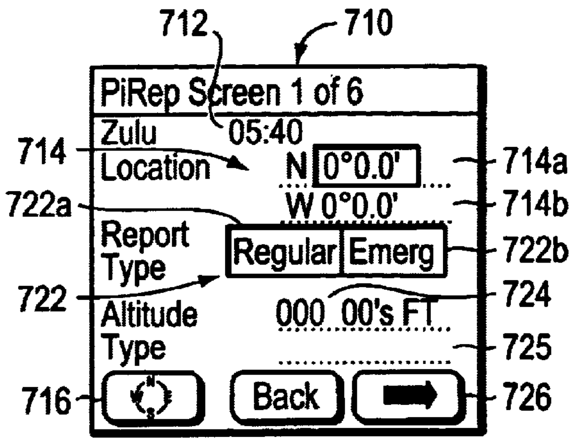
Figure 7C:
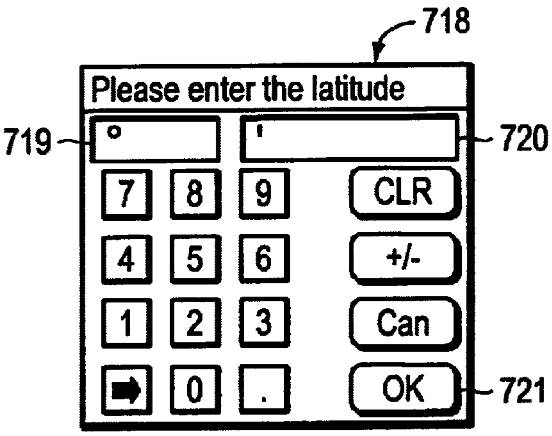

FIG. 7B illustrates a first entry window or screen 710. Screen 710 includes a Zulu time field 712 that is automatically filled-in by the application program 202 based on the UTC off-set entered by the pilot during the setup phase of the flight and the local time as described above. Screen 710 further includes a location field 714 that has longitude and latitude sub-fields 714*a* and 714*b*. A compass icon 716 can be used to call-up a compass keypad 718 (FIG. 7C) for display on screen 230. Compass keypad 718 has a degrees display field 719 and a minutes display field 720 and a plurality of buttons that facilitate the entry of longitude and latitude positions. When the correct longitude or latitude is entered, the pilot taps an OK button 721 and the entered value is copied to sub-fields 714*a* or 714*b*.

Figure 5A:
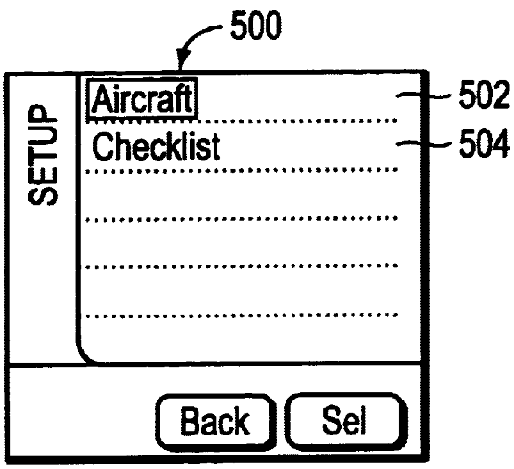
Figure 5B:
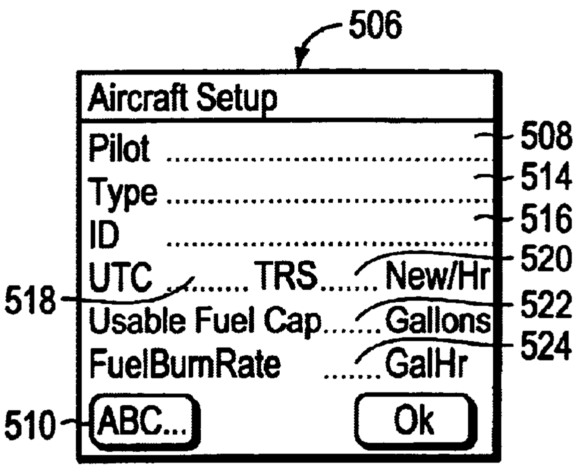
Figure 5C:
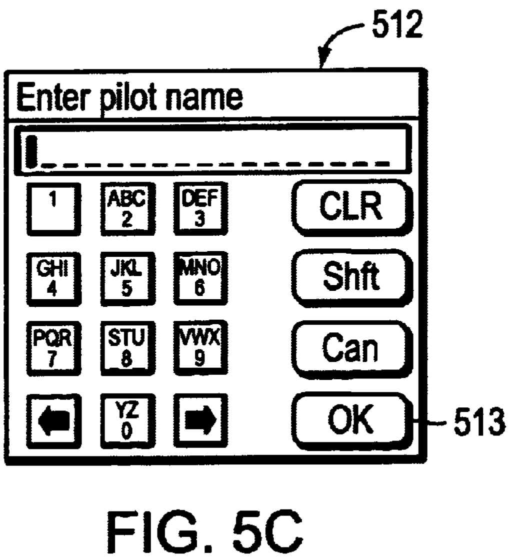
Figure 5D:
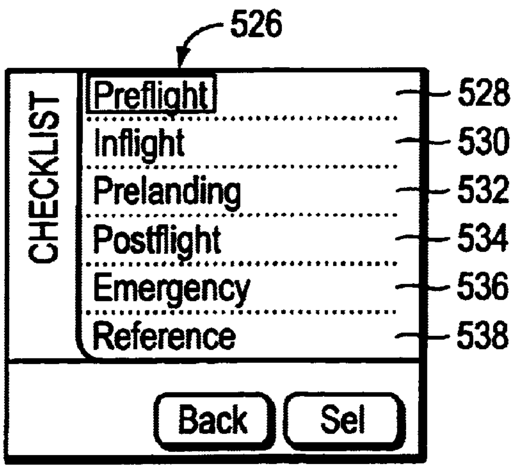
Figure 6A:
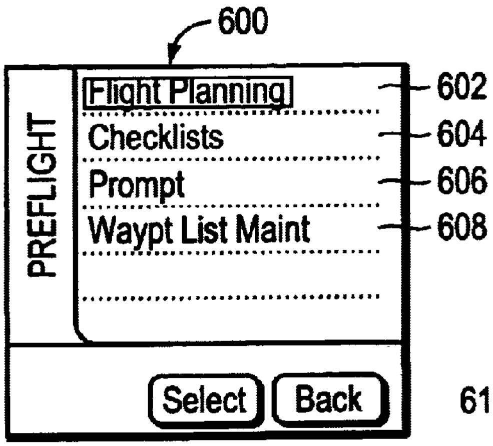
Figure 6B:
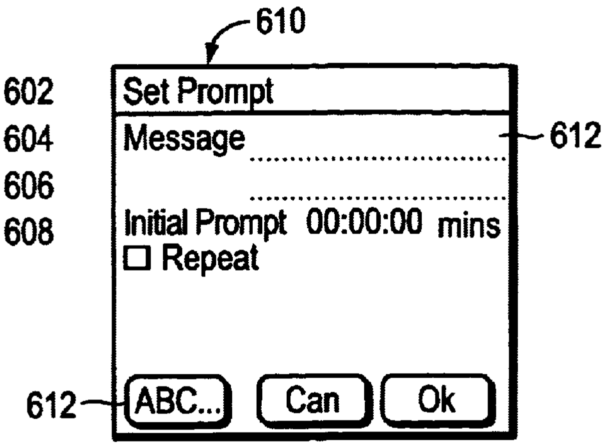
Figure 6C:
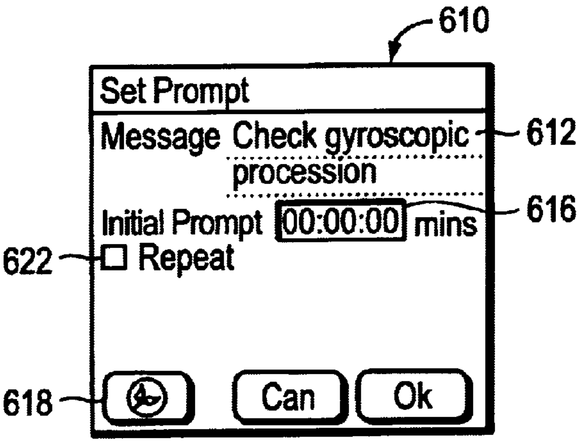
Figure 6D:
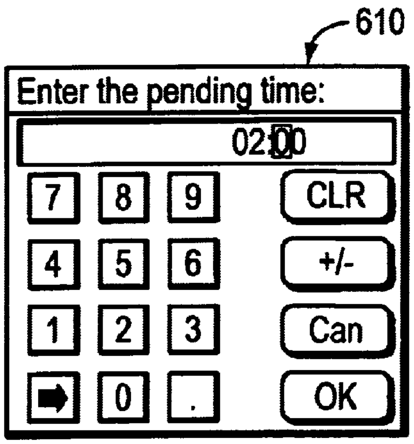
Figure 6E:
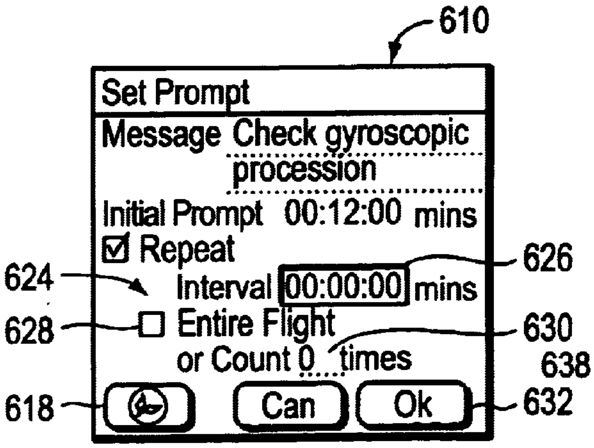
Figure 6F:
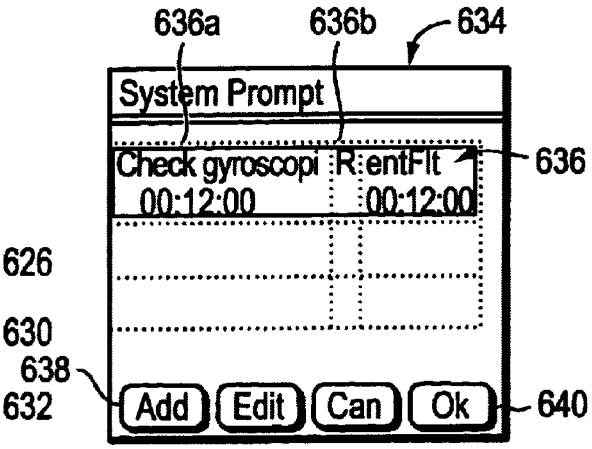

First entry window 710 further includes a report type field 722 that can be set to either emergency or regular by tapping corresponding buttons 722*a* and 722*b*. Window 710 further includes an altitude field 724. By tapping altitude field 724, compass icon 716 is preferably replaced with a numeric (123 . . . ) icon. Selecting the numeric icon causes a numeric keypad to appear to facilitate the entry of the aircraft's altitude. First window 710 further includes an aircraft type field 725. By tapping type field 725, the numeric icon 731 is preferably replaced with an alphanumeric icon, e.g., ABC . . . , which can be tapped to call-up the alphanumeric keypad 512 (FIG. 5C). The alphanumeric keypad 512 can then by used to enter the aircraft type in type field 725.

Figure 7D:
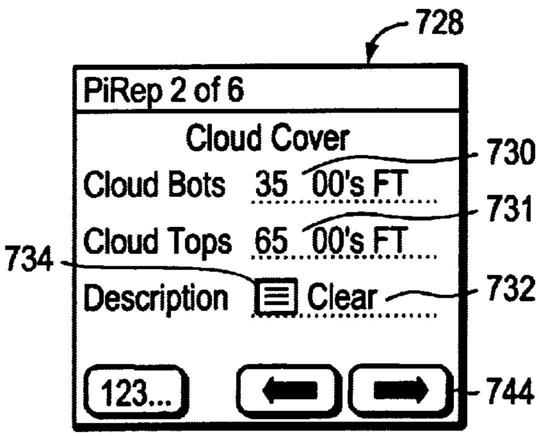
Figure 7E:
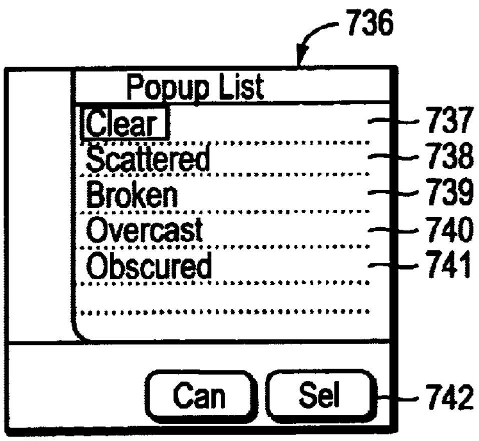
Figure 7F:
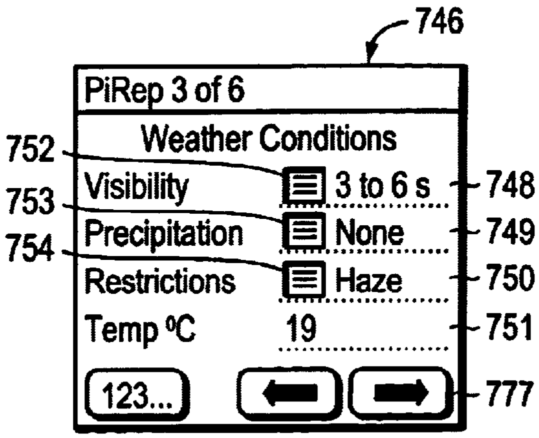
Figure 7G:
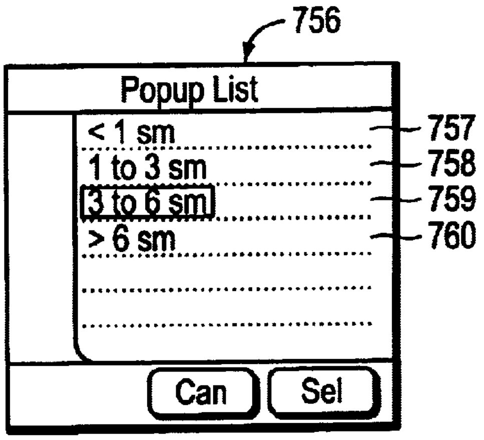
Figure 7H:
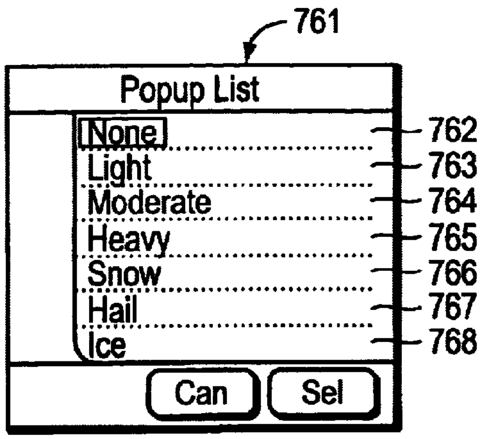
Figure 7I:
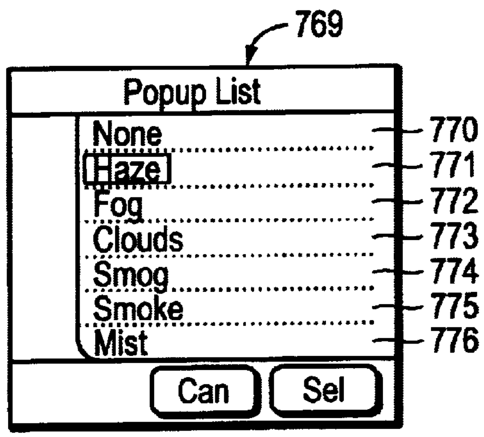
Figure 7J:
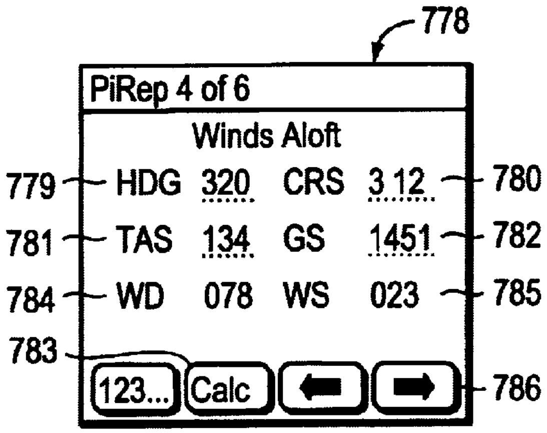
Figure 7K:
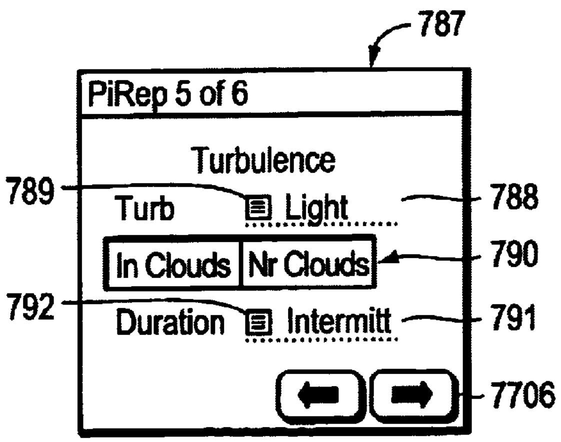
Figure 7L:
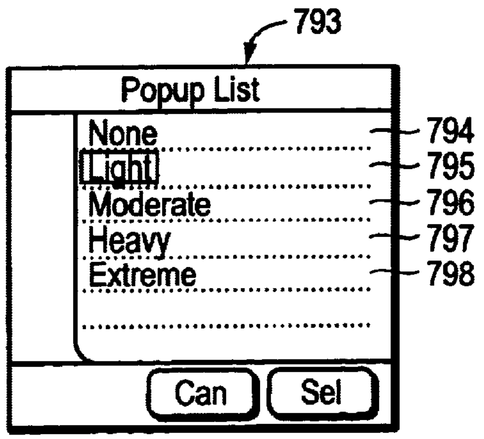
Figure 7M:
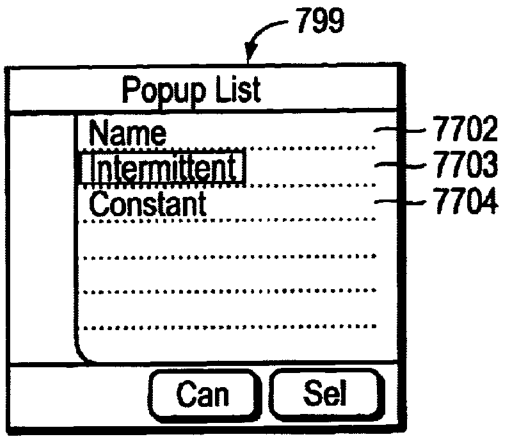
Figure 7N:
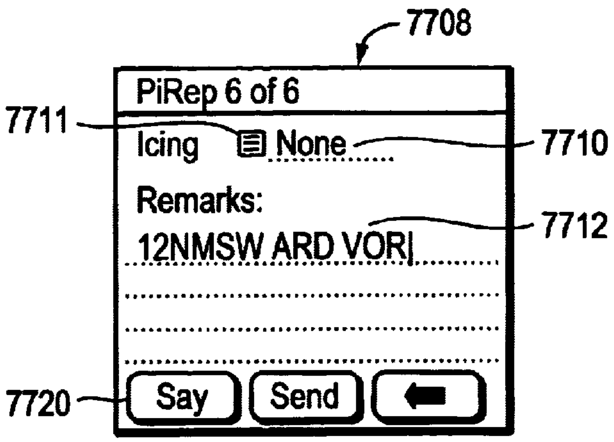
Figure 7O:
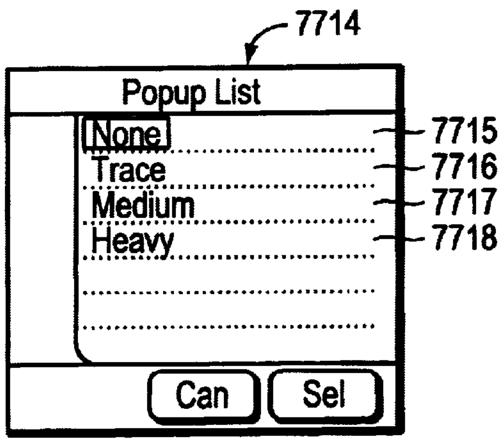
Figure 7P:
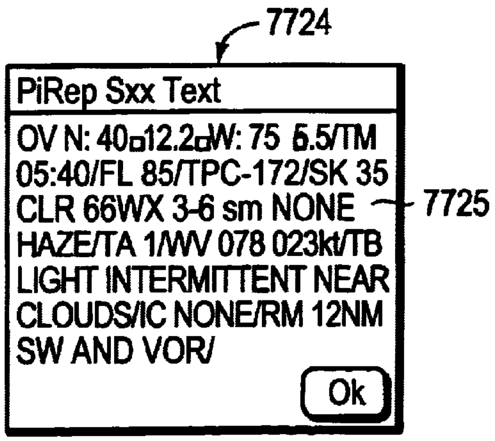

When all of the requested information has been entered in the first window 710, the pilot preferably selects a right arrow 726. This causes the pilot report facility 332 to generate and display the next window in the sequence. FIG. 7D is an exemplary second window 728 which is used to record the cloud cover. In particular, second window 728 has a cloud base field 730 in which the pilot enters the altitude of the base of the clouds, e.g. in hundreds of feet, and a cloud tops field 731 is used to enter the altitude of the tops of the clouds. Second window 728 also has a description field 732 for recording the appropriate cloud characterization. Within or proximate to description field 732 is a pop-up icon 734. By tapping the pop-up icon 734, a new window 736 (FIG. 7E) appears which lists the available characterizations of the cloud cover that are preferably compatible with standard PIREP format. In particular, list window 736 may include a series of buttons, including a clear button 737, a scattered button 738, a broken button 739, an overcast button 740 and an obscured button 741. The pilot preferably highlights one of buttons 737–741, e.g., clear 737, by tapping that button and then tapping a select (SEL) button 742, thereby causing the selected cloud characterization to be copied into description field 732.

By tapping a right arrow 744 (FIG. 7D), the pilot report facility 332 generates and causes a third entry window 746 (FIG. 7F) to appear on screen 230. Third window 746 includes a visibility field 748, a precipitation field 749, a restrictions field 750 and a temperature field 751. Each of fields 748–750, moreover, has a corresponding pop-up icon 752–754. By tapping pop-up icon 751, the pilot causes a visibility list window 756 (FIG. 7G) to appear on screen 230. Visibility list window 756 provides several selectable options, including a "<1 statute miles (sm)" button 757, a "1 to 3 sm" button 758, a "3 to 6 sm" button 759 and a ">6 sm" button 760 any one of which may be selected by the pilot. Tapping pop-up icon 753 causes a precipitation list window 761 (FIG. 7H) to appear. Precipitation list 761 provides several available selections through corresponding buttons, including a none button 762, a light button 763, a moderate button 764, a heavy button 765, a snow button 766, a hail button 767 and an ice button 768. Tapping pop-up icon 754 causes a restrictions list window 769 (FIG. 7I) to appear. Restrictions list 769 similarly provides several available selections or options through corresponding buttons, including a none button 770, a haze button 771, a fog button 772, a clouds button 773, a smog button 774, a smoke button 775, and a mist button 776.

It should be understood that the available options as presented by lists 736, 756, 761 and 769 preferably comply with the standard or accepted PIREP format.

By tapping a right arrow 777 (FIG. 7F), the pilot report facility 332 generates and causes a fourth information entry window 778 (FIG. 7J) to appear on screen 230. Fourth window 778, which seeks information about the winds aloft, includes a heading (HDG) field 779, a course (CRS) field 780, a true airspeed (TAS) field 781, and a ground speed (GS) field 782. Fourth window 778 further includes a calculate (Calc) button 783, a wind direction (WD) display area 784 and a wind speed (WS) display area 785. Preferably, the pilot enters the information requested by fields 779–782 in a similar manner as described above. Next, the pilot taps the Calc button 783. In response, the pilot report facility 332 preferably computes both the wind direction and the wind speed based on the values entered into fields 779–782 in a conventional manner. These computed values are then shown in display areas 784 and 785.

By tapping a right arrow 786 (FIG. 7J), the pilot report facility 332 generates and causes a fifth information entry window 787 (FIG. 7K) to appear on screen 230. Fifth window 787, which seeks information about turbulence, includes a turbulence field 788 which has a corresponding pop-up icon 789, an in or near (nr) clouds selection area 790 and a duration field 791 which has a corresponding pop-up icon 792. Tapping pop-up icon 789 causes a turbulence list window 793 (FIG. 7L) to appear on screen 230. Turbulence list window 793 provides several selectable options, including a none button 794, a light button 795, a moderate button 796, a heavy button 797 and an extreme button 798 any one of which may be selected by the pilot. Tapping pop-up icon 792 causes a duration list window 799 (FIG. 7M) to appear. Duration window 799 also provides several selectable options, including a none button 7702, an intermittent button 7703 and a constant button 7704 any one of which may be selected by the pilot.

By tapping a right arrow 7706 (FIG. 7K), the pilot report facility 332 generates and causes a sixth information entry window 7708 (FIG. 7N) to appear on screen 230. Sixth window 7708, which seeks information about icing, if any, includes an icing field 7710 which has a corresponding pop-up icon 7711 and a remarks field 7712. Tapping pop-up icon 7711 causes an icing list window 7714 (FIG. 7O) to appear on screen 230. Icing list window 7714 provides several selectable options, including a none button 7715, a trace button 7716, a medium button 7717, and a heavy button 7718 any one of which may be selected by the pilot, thereby causing the selected option to appear in icing field 7710. In the remarks field 7712, the pilot may add any additional remarks that he or she wishes and/or which were not covered in one of the earlier information entry windows. Sixth window 7708 further includes a say button 7720.

Tapping the say button 7720 causes the pilot report facility 332 to organize the information entered by the pilot through the information entry windows and to translate that information into a format that is compatible with accepted or standard PIREPS. Specifically, the application program 202 may rely on the PIREP conversion engine 242 to translate the entered information into the appropriate form.

PIREP conversion engine 242 (FIG. 2) includes or has access to accepted or standard PIREP abbreviations and ordering rules. The following table, for example, illustrates some of the PIREP text element indicators, i.e., abbreviations, utilized by engine 242.

| PIREP Abbreviation | Meaning |
|---|---|
| UUA | Urgent |
| UA | Routine |
| /OV | Location in reference to a Very High Frequency (VHF) Navigation Aid (NAVAID) or airport |
| /TM | Time (in four digit UTC) |
| /TP | Type aircraft |
| /SK | Sky condition |
| /WX | Flight visibility |
| /TA | Air temperature |
| /WV | Wind direction and speed |
| /TB | Turbulence |
| IC | Icing |
| /RM | Remarks |

Pilot report facility 332 also generates and causes to be displayed a PIREP display 7724 (FIG. 7P) having a display area 7725. Within display area 7725 is the translated information as generated by the PIREP conversion engine 242. The pilot may now quickly and efficiently provide a PIREP compatible report to the ATC by simply reading the PIREP display 7725.

It should be understood that more or fewer information gathering windows may be displayed by the pilot reports facility 332 to obtain the requisite information for a PIREP and that additional information may also be requested.

Prelanding

Figure 8A:
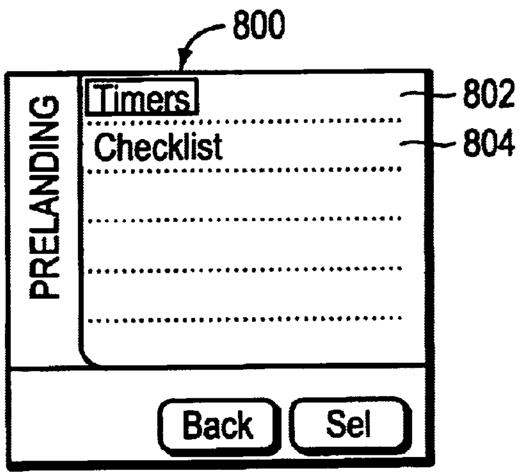
Figure 8B:
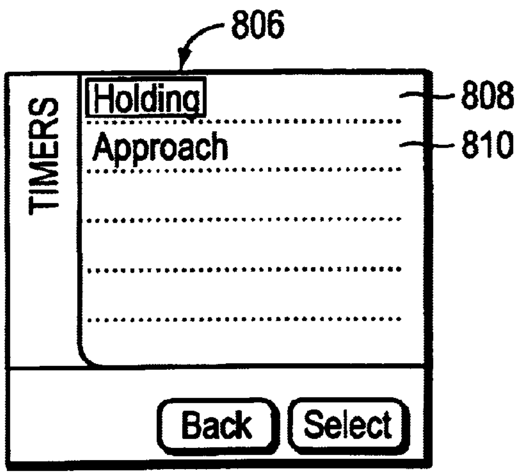
Figure 8C:
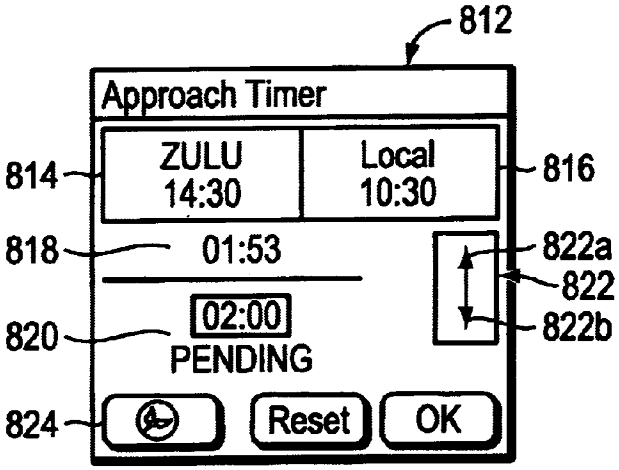

Returning to FIG. 4, selection of the prelanding button 408 causes programming control to be transferred to the prelanding mode 310 of the application program 202. FIGS. 8A–C are exemplary screen displays that may be generated during the prelanding mode 310. In response to selecting the prelanding button 408, for example, a first-level prelanding screen 800 (FIG. 8A) is preferably displayed on screen 230. The prelanding screen 800 includes a timers button 802 and a checklist button 804 which are used to access or run the corresponding facilities 330 and 336 (FIG. 3) of the application program 202.

Timers

By selecting the timers button 802, the timers facility 330 (FIG. 3) of the application program is called and run. Upon selection of button 802, the timers facility 330 preferably generates and displays a first level screen or window 806 (FIG. 8B) which includes a holding timer button 808 and an approach timer button 810. In response to the pilot tapping the approach timer button 810, the timers facility 330 generates and displays an approach timer window 812 (FIG. 8C). The approach timer window 812 preferably includes a Zulu time display area 814 and a local time display area 816 in which the application program 202 automatically enters the corresponding times. Approach timer window 812 further includes an active timer field 818, a pending timer field 820 and an arrow 822 having an up arrow head **822*a* and a down arrow head 822*b***.

To utilize the approach timer window 812, the pilot preferably taps a time entry icon 824 which causes the time entry keypad 620 (FIG. 6D) to temporarily replace the approach window 812 on screen 230. Using the buttons of the time entry keypad 620, the pilot preferably specifies the time associated with the first leg of the approach. For example, if the first leg of the approach is a two minute fly away from the runway, the pilot preferably enters "2:00" in the time entry keypad 620 and taps the OK button of keypad 620. In response, the timers facility 330 copies the specified time, e.g., 2:00, into the pending timer field 820. When the aircraft crosses over the starting point for this leg of the approach, e.g., the runway, the pilot preferably taps either the up arrow head 822*a* or the down arrow head 822*b* depending on whether he or she wishes to have the timers facility 330 execute a count-up (from zero) to the pending time value or a count-down (to zero) from the pending time value.

If the down arrow head 822*b* is tapped, for example, the value of the pending timer field 820, e.g., "2:00", is copied into the active timer field 818 and the count-down is commenced. Preferably, the last entered time, e.g., 2:00 minutes, remains in the pending timer field 820 for reference. The pilot can refer to the on-going time count displayed within the active timer field 818 to facilitate his or her execution of this leg of the approach. As the pilot nears the end of this leg, as indicated by the value of the active timer window approaching zero (or the pending time if count-up was selected), he or she preferably enters the time associated with the next leg of the approach, e.g., a one minute turn around. To enter the new time, the pilot preferably taps the time entry icon 824 which again causes the time entry keypad 620 (FIG. 6D) to temporarily replace the approach window 812 on screen 230. This time, the pilot enters the new time value, e.g., 1:00, and presses the OK button, thereby transferring the new time into the pending timer field 820. Meanwhile, the active timer field 818 continues its count (either up or down) based on the prior pending time value. When the active timer field 818 reaches its end (either zero or the prior pending time value), the pilot initiates the next leg and taps arrow 822, thereby causing the new pending time value, e.g., 1:00, to be transferred into the active timer window 818 and commencing the count (either up or down as selected).

The ability to enter the time associated with the next leg of an approach before completing of the current leg significantly helps the pilot in flying the approach pattern.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for use by a pilot in managing and performing flight-related tasks, the system comprising:

a housing configured for carrying by the pilot onto an aircraft;

a display/input screen mounted to the housing; and a programmable microprocessor coupled to the display/input screen and disposed within the housing, wherein the microprocessor is programmed to periodically display independently of the aircraft's position one or more bulletins on the screen directing the pilot to perform a specific flight-related task.

2. The system of claim 1 further comprising an acknowledgement button for activation by the pilot, the acknowledgement button in communicating relationship with the programmable microprocessor, wherein the microprocessor is further programmed to clear the one or more displayed bulletins from the screen in response to activation of the acknowledgement button by the pilot.

3. The system of claim 2 further comprising a warning element operatively coupled to the microprocessor, the warning element directed to issue at least one of a visual, tactile and aural reminder to the pilot by the microprocessor if a corresponding acknowledgement is not received within a predetermined time.

4. The system of claim 2 wherein one or more of the bulletins instructs the pilot to check an aircraft subsystem.

5. The system of claim 2 further comprising an enroute timer accessible by the microprocessor that tracks elapsed time of a flight, wherein the microprocessor is further programmed to first display a given bulletin after a predetermined elapsed time into the flight and to thereafter repeatedly display the given bulletin at a programmed interval.

6. The system of claim 5 wherein the microprocessor is further programmed to stop displaying the given bulletin after the bulletin has displayed a preset number of times.

7. The system of claim 6 wherein the microprocessor displays one or more programming windows on the display/input screen for establishing the given bulletin, and the one or more programming windows include at least one data entry fields configured to receive the preset number of times that the given bulletin is to be displayed.

8. The system of claim 1 wherein in one or more of the bulletins instruct the pilot to check on the status of an aircraft subsystem.

9. The system of claim 1 further comprising an enroute timer accessible by the microprocessor that tracks elapsed time of a flight, wherein the microprocessor is further programmed to first display a given bulletin after a predetermined elapsed time into the flight and to thereafter repeatedly display the given bulletin at a programmed interval.

10. The system of claim 1 wherein the microprocessor displays one or more programming windows on the display/input screen for establishing a first bulletin.

11. The system of claim 10 wherein the one or more programming windows include a plurality of data entry fields, the plurality of data entry fields configured to receive one or more of:

a specified message corresponding to the first bulletin, a specified initial time at which the message is to be first displayed on the display/input screen, an indication as to whether the message is to be repeated periodically during the flight, and a specified time interval for setting the period during which the message is to be repeated.

12. The system of claim 1 wherein the microprocessor translates information received from the pilot into a format that is compatible with a Pilot Report (PIREP) standard.

13. The system of claim 12 wherein the microprocessor displays the translated information in PIREP format on the display/input screen.

* * * * *